United States Patent Office.

KARL SCHWICKERATH, OF DETROIT, MICHIGAN.

COMPOUND OF IRON AND NUCLEIN AND PROCESS OF MAKING SAME.

SPECIFICATION forming part of Letters Patent No. 637,354, dated November 21, 1899.

Application filed October 6, 1898. Serial No. 692,782. (No specimens.)

*To all whom it may concern:*

Be it known that I, KARL SCHWICKERATH, a subject of the King of Prussia, German Emperor, residing at Detroit, county of Wayne, State of Michigan, have invented a certain new and useful Improvement in Processes of Preparing Compound of Nuclein and Iron and Product; and I declare the following to be a full, clear, and exact description of the invention, such as will enable others skilled in the art to which it pertains to make and use the same.

My invention relates to a process for and the manufacture of a new soluble compound of nuclein and iron not heretofore known; and it consists in the process and the compound as an article of manufacture, as is hereinafter described.

In order to form this compound, I dissolve about three hundred grams of nuclein in about six liters of water, or sufficient water to form a solution. To this is added an excess of alkali, which for the proportion specified would be about one hundred and fifty grams of (preferably) sodium carbonate. The object of adding the alkali is to neutralize the acid character of the nuclein and to create an excess of alkali in the solution. To this alkaline solution of nuclein I add about one hundred and five grams of iron-chloride solution of thirteen-per-cent. strength diluted with about two hundred cubic centimeters of water. The reaction which takes place on adding a solution of iron chloride to the solution of nuclein containing an excess of alkali is the formation of iron hydroxide, which combines in *statu nascendi* with the nuclein, forming the combination of nuclein and iron, as set forth, and which is thereafter precipitated by the addition of about twice its volume of alcohol and *quantum sufficit* of a concentrated neutral-salt solution, as sodium chloride. The precipitate is washed with alcohol, pressed, and dried. It is of a light cinnamon color and contains about four and one-half per cent. of iron. It is soluble in water and dilute alcohol and is not precipitated by alkalies nor attacked by dilute acids. I have found that artificial gastric juice has no influence upon it. It is perfectly tasteless and is not directly precipitated by ammonium sulphide, which merely changes the color to a light green, which on standing grows darker. The fact that this compound is not affected by gastric juice, is tasteless, and free from astringency renders it of great value as a pharmaceutical preparation.

Of course any multiple or division of the proportions given may be used.

What I claim is—

1. The herein-described method of preparing a compound of nuclein and iron, consisting in adding to an alkaline solution of nuclein a soluble ferric salt in solution, precipitating the resultant compound of nuclein and iron, separating the precipitate, washing it, and drying it, substantially as described.

2. As a new product, the new soluble compound of nuclein and iron containing about four and one-half per cent. of iron, and about four and one-half per cent. of phosphorus included in the nuclein, and which is not precipitated by alkalies, ammonium sulphide, nor dilute acids, is tasteless and free from astringency, substantially as set forth.

In testimony whereof I sign this specification in the presence of two witnesses.

KARL SCHWICKERATH.

Witnesses:
R. A. PARKER,
MARION A. REEVE.